Jan. 17, 1939. H. W. BATCHELLER 2,144,137
RHEOSTAT SWITCH
Filed Oct. 30, 1935
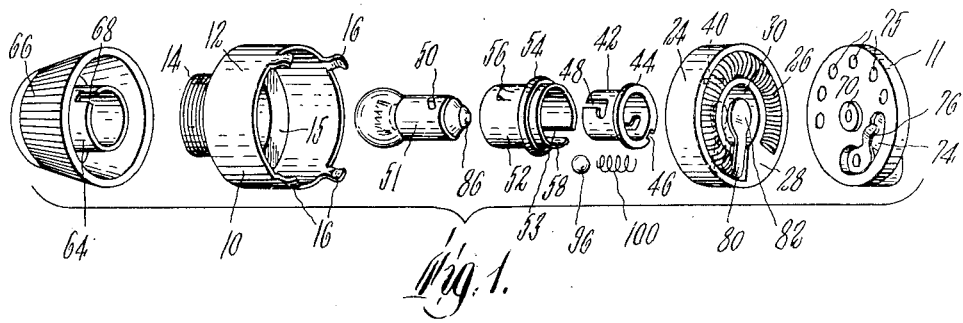
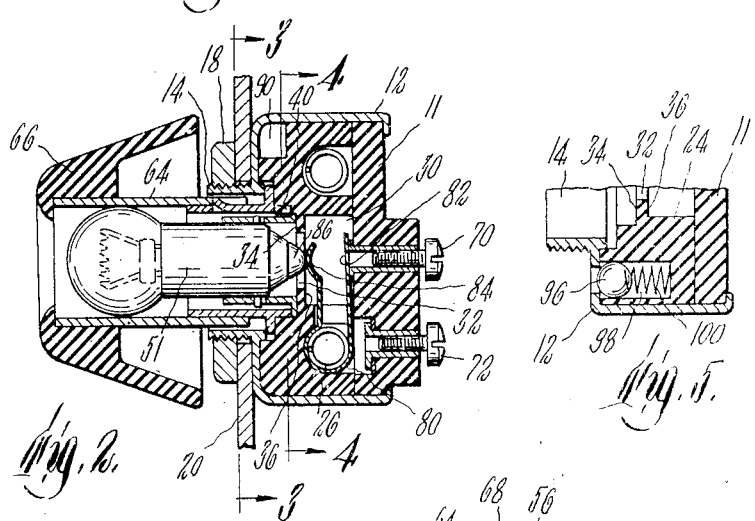
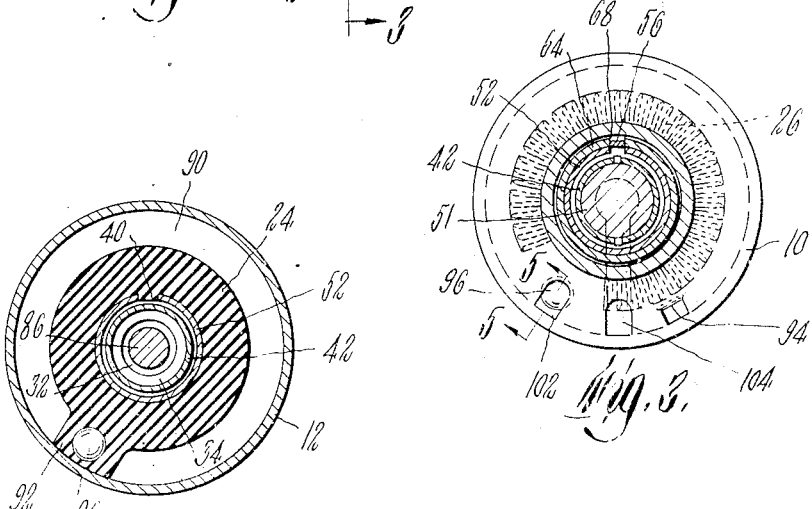
Inventor
Hugh W. Batcheller
by Wright, Brown, Quinby & May
Attys.

Patented Jan. 17, 1939

2,144,137

UNITED STATES PATENT OFFICE 2,144,137

RHEOSTAT SWITCH

Hugh W. Batcheller, Waltham, Mass., assignor to Standard Mfg. Co., Worcester, Mass., a corporation of Massachusetts Application October 30, 1935, Serial No. 47,423

5 Claims. (Cl. 201—56)

This invention relates to a rheostat switch which may, if desired, include a tell-tale lamp. It is an object of the present invention to provide a switch suitable for use with small motors such as those employed in connection with heaters for automobiles. Such switches must be small in size and simple and positive in operation.

According to the present invention, a switch is provided in which there are novel features of structure and novel cooperation between certain of the parts, the switch being designed so that machine assembling is almost entirely avoided, the parts being capable of being easily and rapidly assembled by hand, thus materially cutting down the total cost of the switch. Furthermore, certain of the parts are so designed as to be made by inexpensive methods, further reducing the cost of the completed article.

For a more complete understanding of the invention, reference may be had to the disclosure of an embodiment thereof in the following description and the illustration thereof on the drawing of which Figure 1 is an exploded perspective view of an embodiment of the invention.

Figure 2 is a sectional view of the assembled switch.

Figure 3 is a section on the line 3—3 of Figure 2.

Figure 4 is a section on the line 4—4 of Figure 2.

Figure 5 is a fragmentary section on the line 5—5 of Figure 3.

The enclosed parts of the switch are contained in a housing consisting preferably of a cup-shaped metal member 10 and a fixed end plate 11, the latter being preferably made of suitable insulating material such as a molded phenolic condensation product, vulcanized fiber or an equivalent. The metal housing member 10 consists of a cylindrical portion 12 and a smaller cylindrical portion 14 coaxial therewith and connected thereto by an annular shoulder portion 15. At the open end of the large portion 12 are a number of ears 16 which are adapted to be bent over the edge of the plate 11 when the latter is placed in position over the open end of the housing member 10. The reduced cylindrical portion 14 of the housing member is preferably exteriorly threaded as indicated to receive a nut 18 by which the switch may be secured to a dashboard 20 or other supporting wall. Rotatively fitted within the large portion 12 of the housing member is a rotor 24 which is of suitable insulating material such as a molded phenolic condensation product, porcelain, vulcanized fiber, or any other suitable equivalent, and which may be in the form of a rotatable plate or disk. In many respects the rotor 24 resembles a rotor for a rheostat switch described and claimed in my copending application Serial No. 689,585, filed September 15, 1933, which has matured into Patent No. 2,113,366. The rear face of the rotor 24 is provided with an arcuate recess or channel concentric with the axis of the rotor, this recess being adapted to contain a helically coiled resistance unit 26. The arcuate recess forms a nearly complete circle, its ends being spaced as at 28 by a sector of insulating material. Concentric with the arcuate recess is a central cylindrical recess 30 which extends about half way through the rotor 24. In the front face of the rotor is a stepped central recess which is connected to the recess 30 as by an aperture 32. The stepped recess forms a pair of annular shoulders 34 and 36 within the rotor. Within this recess a key element 40 juts out from the side wall and is preferably integral with the rotor itself. Seated in the recess against the shoulder 34 is a lamp socket member 42. This socket member is provided with an end flange 44 which rests against the shoulder 34 of the rotor and which has a notch 46 to receive the key element 40 whereby relative rotation between the socket member 42 and the rotor is prevented. The socket member is also provided with bayonet slots 48 to receive a pair of pins 50 on the base of the electric lamp 51, this form of connection between the lamp and socket being well known in the art. Surrounding the socket 42 in the front recess of the rotor is a hollow shaft 52 which is split as at 53, this shaft having a radial flange 54 between the ends thereof and a laterally projecting ear 56. The rear end edge 58 of the shaft is adapted to rest upon the flange 44 of the socket member 42, the key element 40 being received in the split 53. Thus the shaft 52 must rotate with the rotor 24 and socket member 42. The outer diameter of the shaft 52 is less than the inner diameter of the threaded projection 14 of the housing member 10 so as to receive a tubular shaft 64 of an operating knob 66. The inner diameter of the tubular shaft 64 is such as to make a frictional fit on the shaft 52, the shaft 64 being notched as at 68 to receive the laterally projecting ear 56 so that the shaft 52 may be positively rotated by manual operation of the knob 66. As indicated in Figure 2, the rotor 24 is confined between the shoulder 15 of the metal housing member 10 and the forward face of the fixed plate 11. The fixed plate 11 is provided with a pair of suitable binding posts 70 and 72 to which wires from the battery and motor may be attached. The binding post 70 is concentric with the axis of the switch, the binding post 72 being offset so as to be in line with the resistance element 26. The fixed plate 11 is formed with a suitable recess 74 in which is mounted a resilient contact finger 76 adapted for wiping engagement with the resistance element 26. Ventilation holes 75 are also provided for the escape of heat generated in the resistance coil 26. When the switch is in its "off" position, the contact finger 76 rides on the sector 28 of the rotor so that it is entirely disconnected from the other metal parts of the switch. The contact finger 76 is permanently connected with the binding post 72. Surrounding one end of the resistance element 26 is a U-shaped metal member 80, one leg 82 of which extends into the central portion of the recess 30 and normally presses against the inner end of the binding post 70. The other leg 84 of the conductor 80 extends into the central portion of the recess 32 for resilient engagement with the base button 86 of the lamp 51. For this purpose, the end portion of the leg 84 may be made convex as indicated in Figure 2. The resilient leg 84 of the conductor 80 not only serves to connect the button 86 of the lamp electrically with the binding post 70 but also presses the lamp forward. This pressing action has two results, one being to maintain the pins 50 in the bayonet slots 48 and the other being to press the flange 54 against the inner shoulder 15 of the metal housing member 10. This is accomplished by the forward pressure of the pins 50 on the socket member 42, the flange 44 of the socket member in turn pressing against the end edge 58 of the split shaft 52. This provides for suitable electrical contact between the lamp base and the housing member 10, the latter being suitably grounded as through the metallic dash-board 20.

The front face of the rotor 24 is grooved as at 90, the groove extending around most of the periphery of the face but being interrupted to form a boss as at 92. As indicated in Figure 3, the housing member 10 is punched so as to form a rearwardly bent tongue 94 which rides in the groove 90 as the rotor 24 is turned within the housing 10. The boss 92 thus serves as a limit stop element engaging the tongue 94 when the rotor is turned as far as possible in either direction.

Means is provided for indicating to the operator by the sense of feel when the switch is in its "off" and "on" positions. Such means, as shown, consists of a ball 96 which is disposed in a bore 98 and is pressed in a forward direction by a spring 100 behind it, the spring being seated in the recess 98. This recess extends part way through the rotor from the front face thereof, parallel to the axis of the rotor, and may be formed in the rotor when the latter is molded. In order not to intersect the arcuate channel which contains the resistance element 26, the bore 98 is preferably located opposite the sector 28. The shoulder 15 of the housing member 10 is provided with suitable recesses or apertures 102, 104 to receive the forward portion of the ball 96. When the ball enters either of these apertures, it acts as a yielding detent against rotation of the rotor 24. The parts are so arranged that, when the ball 96 engages in the aperture 104, the finger 76 rides on the sector 28, the tongue 94 is against one side of the boss 92, and the switch is then in its "off" position. When the rotor is turned from this position to that illustrated in Figure 3 wherein the ball 96 engages in the aperture 102, the contact finger 76 rides on the U-shaped conductor 80 so that the switch is then in its "on" position with none of the resistance 26 cut into the circuit. Further rotation of the rotor in the same direction causes the finger 76 to slide on the resistance member 26, cutting in more and more of the latter until substantially all of it is included in series in the circuit.

In assembling the switch, the U-shaped member 80 is slipped over an end of the resistance coil 26, and these two parts are manually pressed into place in the rear face of the rotor 24. A plate 11 may be laid on a table with its front face up, and a rotor placed thereon in predetermined angular relation thereto. Into the hole 98 is dropped a spring 100 and a ball 96. A socket 42 and a shaft 52 are telescoped together and placed in the front recess of the rotor, the key element 40 entering the notch 46 and the split 53. The metal housing member 10 is then placed over the previously assembled parts in predetermined angular relation thereto. The parts are pressed firmly into the cavity of the housing member 10 and the ears 16 are then bent over against the rear face of the plate 11. A lamp may now be inserted in the socket 42 in the usual manner and a knob 66 may be pushed into place with its shaft 64 telescoping on and locking with the shaft 52. Thus the assembling can be quickly and easily done by hand.

It is evident that various modifications and changes may be made in the specific embodiment of the invention herein shown and described, without departing from its spirit or scope as defined in the following claims.

I claim:

1. A rheostat switch comprising a disk-shaped rotor of insulating material having an arcuate channel in one face thereof, a circular depression in the other face thereof and a central aperture smaller than and concentric with said circular depression, a key element projecting inward from the wall of said circular depression, a tubular metal socket member seated in said circular depression having an end flange with a notch interlocking with said key element, a tubular shaft member in said circular depression outside said socket member seated in said flange and interlocking with said key element whereby said rotor and said members rotate together as a unit, an operating knob frictionally mounted on said shaft member and keyed thereto for rotation therewith, a helical resistance coil disposed in said arcuate channel, a housing enclosing said rotor, and resilient means carried by said rotor and arranged to connect electrically said resistance element with the central terminal of a lamp mounted in said socket and to press said socket member into electrical contact with said shaft member and said shaft member into electrical contact with said housing.

2. In a rheostat switch, a housing having an inwardly projecting stop element and inner recesses, a circular rotor of molded insulating material rotatable within said housing, a boss on the front face of said rotor adjacent to the periphery thereof and engageable by said stop element to limit the rotation of said rotor, said boss having a bore therein parallel to the axis of rotation of the rotor, yielding detent means for said rotor including a spring and ball within said bore to engage said inner recesses in the housing, switch elements carried by said rotor and housing, and means actuable to rotate said rotor.

3. A rheostat switch comprising a housing member having two coaxial cylindrical portions of different diameter connected by an annular shoulder portion, a fixed plate secured to said housing member across its large diameter end and having a recess in the inner face thereof, a rotor of insulating material rotatably mounted within said housing member between said shoulder and said fixed plate, an elongated resistance element arcuately disposed in the end face of said rotor opposed to said plate, a spring contact finger anchored to said plate in said recess and tending to project from the plane thereof for wiping contact with said resistance element, a pair of terminals carried by said fixed plate, means electrically connecting said terminals respectively with said contact finger and an end of said resistance element, and manually operable means for rotating said rotor.

4. As a new article of manufacture, a rotor for a rheostat switch which includes a housing with an annular shoulder formed with inner depressions, said rotor comprising a single molded disk-like member of insulating material having a central circular recess in its front face, a central circular recess in its rear face, a central aperture connecting said recesses, and an arcuate channel for a resistance coil in the rear face surrounding the central recess therein except for a small sector, said member also having a small bore parallel to the axis of the member and radially outside of the recess in the front face, said bore extending rearwardly from the front face only part way through the member in the sector between the ends of the channel to hold a spring and detent element for cooperation with said depressions.

5. In a rheostat switch, a housing having a metal cup-shaped member with a central aperture, a rotor of insulating material in said housing, a hollow shaft projecting through said aperture, said shaft having an external flange between its ends bearing against the inner surface of the housing, a hollow lamp socket member nested within said hollow shaft and provided with an external flange at its inner end engaging the inner end edge of said shaft, said rotor having a central recess in a face thereof to receive the inner ends of said shaft and socket member, keyed connections between said rotor, shaft and socket member for rotation thereof as a unit, and resilient contact means carried by said rotor and adapted to press against the tip of a lamp mounted in said socket member, whereby the socket flange presses against the inner end edge of the shaft and the shaft flange presses against the inner surface of the housing.

HUGH W. BATCHELLER.